(12) United States Patent
Wang et al.

(10) Patent No.: US 8,306,549 B2
(45) Date of Patent: Nov. 6, 2012

(54) METHOD AND APPARATUS FOR SUPPRESSING INTER-CELL INTERFERENCE

(75) Inventors: Yong Wang, Xi'an (CN); Shaozhong Fu, Shenzhen (CN); Tao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 12/826,871

(22) Filed: Jun. 30, 2010

(65) Prior Publication Data

US 2010/0331007 A1  Dec. 30, 2010

(30) Foreign Application Priority Data

Jun. 30, 2009  (CN) .......................... 2009 1 0150053

(51) Int. Cl.
*H04W 72/00* (2009.01)
*H04W 40/00* (2009.01)
*H04B 15/00* (2006.01)

(52) U.S. Cl. .................. 455/452.2; 455/447; 455/63.1
(58) Field of Classification Search .............. 455/452.2
See application file for complete search history.

(56) References Cited

U.S. PATENT DOCUMENTS

| | | | |
|---|---|---|---|
| 5,737,702 A | 4/1998 | Madhavapeddy et al. | |
| 5,842,127 A | 11/1998 | Pashtan et al. | |
| 5,953,667 A | 9/1999 | Kauppi | |
| 5,960,356 A | 9/1999 | Alperovich et al. | |
| 7,072,674 B1 | 7/2006 | Mademann | |
| 7,161,896 B1 * | 1/2007 | Hart et al. | 370/206 |
| 7,194,276 B2 | 3/2007 | Bejerano et al. | |
| 2005/0272432 A1 | 12/2005 | Ji et al. | |
| 2007/0086406 A1 | 4/2007 | Papasakellariou | |
| 2009/0201867 A1 * | 8/2009 | Teo et al. | 370/329 |
| 2010/0267338 A1 * | 10/2010 | Chiu et al. | 455/63.1 |

FOREIGN PATENT DOCUMENTS

| | | |
|---|---|---|
| CN | 1195451 | 10/1998 |
| CN | 101242640 | 8/2008 |
| CN | 101291515 | 10/2008 |
| CN | 101350935 | 1/2009 |
| WO | 2009/008806 | 1/2009 |

OTHER PUBLICATIONS

Chang, R. et al., *A Graph Approach to Dynamic Fractional Frequency Reuse (FFR) in Multi-Cell OFDMA Networks*, IEEE International Conference on Communications, Jun. 14, 2009, pp. 1-6.
Extended European Search Report, mailed Oct. 13, 2010, in corresponding European Application No. 10167932.2.

* cited by examiner

*Primary Examiner* — Lester Kincaid
*Assistant Examiner* — Andy Gu
(74) *Attorney, Agent, or Firm* — Staas & Halsey LLP

(57) ABSTRACT

The present invention discloses a method and an apparatus for suppressing inter-cell interference. The method includes: obtaining edge channels whose signal interference ratio (SIR) is above a preset threshold from edge channel group to constitute a first candidate channel set; selecting an edge channel of the lowest correlation as a tier-1 channel; obtaining central channels whose SIR are above a preset threshold from central channel group to constitute a second candidate channel set; selecting a central channel of the lowest correlation as a tier-2 channel; and comparing SIRs of the tier-1 channel and the tier-2 channel and assigning the channel of a higher SIR to an edge terminal in the local cell. The present invention may suppress inter-cell interference and reduce the waste of channel resources.

16 Claims, 6 Drawing Sheets

METHOD AND APPARATUS FOR SUPPRESSING INTER-CELL INTERFERENCE

CROSS-REFERENCE TO RELATED APPLICATION

This application claims priority to Chinese Patent Application No. 200910150053.0, filed on Jun. 30, 2009, which is hereby incorporated by reference in its entirety.

FIELD OF THE INVENTION

The present invention relates to communications technologies, and in particular, to a method and an apparatus for suppressing inter-cell interference (ICI).

BACKGROUND OF THE INVENTION

To further increase efficiency of a system spectrum and effectively resist the selective frequency fading of a radio channel, orthogonal frequency division multiple access (OFDMA) is adopted in the long term evolution (LTE) project of the 3rd generation (3G) mobile communications system. With OFDMA, the information about all terminals within a cell is carried on different carriers that are mutually orthogonal. All interference in the cell comes from other adjacent cells. A terminal in the central area of the cell (hereinafter referred to as "central terminal") is near to the base station of the cell and the interference signals of adjacent cells are far from the base station of the cell. The signal interference ratio (SIR) is therefore relatively high for the central terminal. For a terminal located in the edge area of the cell (hereinafter referred to as "edge terminal"), because users using the same carrier resource in the adjacent cells impose strong interference on the terminal and the terminal is far from the base station of the cell, the SIR is relatively low. As a result, the quality of service (QoS) of users at the cell edge is poor and the throughput is small. In LTE, therefore, ICI suppression techniques are very important.

In a method for suppressing ICI provided in the prior art, the base station divides channel resources of the cell into central channel group and edge channel group. The central channels of adjacent cells support soft frequency reuse and the edge channels of adjacent cells are orthogonal. Because central users of adjacent cells are far apart, the interference between them is weak. Therefore, the same frequency may be reused by the central channels of adjacent cells, which is known as soft frequency reuse. Because the edge channels of adjacent cells are orthogonal, the interference between edge terminals in the adjacent cells is effectively avoided. The base station may divide the central channel group and the edge channel group according to the transmit power, or distance, or channel SIR. The base station may detect the pilot information reported by a terminal to determine whether the terminal is an edge terminal or a central terminal. If the terminal is an edge terminal, the base station selects a channel of the highest SIR from an edge channel group and assigns the channel to the edge terminal. If the terminal is a central terminal, the base station selects a channel of the highest SIR from a central channel group and assigns the channel to the central terminal.

The inventor finds that when the above method is used to divide central channel group and edge channel group, where central channels of adjacent cells support soft frequency reuse and edge channels are orthogonal, ICI can be suppressed to a certain extent. When there are few or no edge terminals, however, edge channels to be assigned to edge terminals will not be assigned to central terminals; or when there are few or no central terminals, central channels to be assigned to the central terminals will not be assigned to edge terminals. This causes a waste of channel resources.

SUMMARY OF THE INVENTION

Embodiments of the present invention provide a method and an apparatus for suppressing ICI to suppress inter-cell interference and reduce the waste of channel resources.

For the purposes, the following technical solution is provided:

A method for suppressing ICI includes:

obtaining edge channels whose SIR are greater than a first preset threshold from one or more edge channel groups to constitute a first candidate channel set, where the edge channels are orthogonal to edge channels of adjacent cells;

calculating a correlation between each edge channel in the first candidate channel set and a strongest interference channel of the edge channel and selecting an edge channel of the lowest correlation as a tier-1 channel;

obtaining central channels whose SIR are above a second preset threshold from one or more central channel groups to constitute a second candidate channel set, where the central channels use the same soft frequency as central channels of the adjacent cells;

calculating a correlation between each central channel in the second candidate channel set and a strongest interference channel of the central channel and selecting a central channel of the lowest correlation as a tier-2 channel; and comparing SIRs of the tier-1 channel and the tier-2 channel and assigning the channel of a higher SIR to an edge terminal in the cell which the edge terminal accessed.

Another method for suppressing ICI includes:

obtaining central channels whose SIR are above a first preset threshold from one or more central channel groups to constitute a first candidate channel set, where the central channels use the same soft frequency as central channels of adjacent cells;

calculating a correlation between each central channel in the first candidate channel set and a strongest interference channel of the central channel, and selecting a central channel of the lowest correlation as a tier-1 channel;

obtaining edge channels whose SIR are above a second preset threshold from one or more edge channel groups to constitute a second candidate channel set, where the edge channels are orthogonal to edge channels of the adjacent cells;

calculating a correlation between each edge channel in the second candidate channel set and a strongest interference channel of the edge channel and selecting an edge channel of the lowest correlation as a tier-2 channel; and comparing SIRs of the tier-1 channel and the tier-2 channel and assigning a channel of a higher SIR to a central terminal in the cell which the terminal accessed.

An apparatus for suppressing ICI includes:

a first obtaining module, adapted to obtain edge channels whose SIR are above a first preset threshold from one or more edge channel groups to constitute a first candidate channel set, where the edge channels are orthogonal to edge channels of adjacent cells;

a first calculating and selecting module, adapted to calculate correlation between each edge channel in the first candidate channel set and a strongest interference channel of the edge channel and select an edge channel of the lowest correlation as a tier-1 channel;

a second obtaining module, adapted to obtain central channels whose SIR are above a second preset threshold from one or more central channel groups to constitute a second candidate channel set, where the central channels use the same soft frequency as central channels of the adjacent cells;

a second calculating and selecting module, adapted to calculate correlation between each central channel in the second candidate channel set and a strongest interference channel of the central channel and select a central channel of the lowest correlation as a tier-2 channel; and an assigning module, adapted to compare SIRs of the tier-1 channel and the tier-2 channel and assign a channel of a higher SIR to an edge terminal in the cell which the terminal accessed.

Another apparatus for suppressing ICI includes:

a first obtaining module, adapted to obtain central channels whose SIR are above a first preset threshold from one or more edge channel groups to constitute a first candidate channel set, where the central channels use the same soft frequency as central channels of adjacent cells;

a first calculating and selecting module, adapted to calculate correlation between each central channel in the first candidate channel set and a strongest interference channel of the central channel and select a central channel of the lowest correlation as a tier-1 channel;

a second obtaining module, adapted to obtain central channels whose SIR are above a second preset threshold from one or more central channel groups to constitute a second candidate channel set, where the edge channels are orthogonal to edge channels of the adjacent cells;

a second calculating and selecting module, adapted to calculate correlation between each edge channel in the second candidate channel set and a strongest interference channel of the edge channel and select an edge channel of the lowest correlation as a tier-2 channel; and an assigning module, adapted to compare SIRs of the tier-1 channel and the tier-2 channel and assign a channel of a higher SIR to a central terminal in the cell which the terminal accessed.

Like the prior art, the methods in the embodiments of the present invention also divide central channel group and edge channel group where central channels of adjacent cells support soft frequency reuse and edge channels of adjacent cells are orthogonal. The difference is: In the embodiments of the present invention, when a channel is assigned to an edge terminal, the optimal tier-1 channel is found from the edge channel group and further the optimal tier-2 channel is found from the central channels of the cell; the performance of the tier-1 channel is compared with the performance of the tier-2 channel and the channel of better performance is assigned to the edge terminal. Likewise, when a channel is assigned to a central terminal, the optimal tier-1 channel is found from the central channel group and further the optimal tier-2 channel is found from the edge channels of the cell; the performance of the tier-1 channel is compared with the performance of the tier-2 channel and the channel of better performance is assigned to the central terminal. When suppressing ICI, the embodiments of the present invention reduce the occurrences where edge channels to be assigned to edge terminals are not assigned to central terminals when there are few or no edge terminals and the occurrences where central channels to be assigned to central terminals are not assigned to edge terminals when there are few or no central terminals, and thus the waste of channel resources is reduced.

BRIEF DESCRIPTION OF THE DRAWINGS

To make the technical solution under the present invention clearer, the accompanying drawings for illustrating the embodiments of the present invention or the prior art are outlined below. Apparently, the accompanying drawings are for the exemplary purpose only, and person having ordinary skill in the art can derive other drawings from such accompanying drawings without any creative effort.

DETAILED DESCRIPTION OF THE EMBODIMENTS

The following detailed description is directed to the technical solution of the present invention with reference to the accompanying drawings. However, the embodiments to be described are only part of, rather than all of, the embodiments of the present invention. Those skilled in the art can derive other embodiments from the embodiments given herein without making any creative effort, and all such embodiments are covered in the protection scope of the present invention.

Embodiment 1

Figure 1:
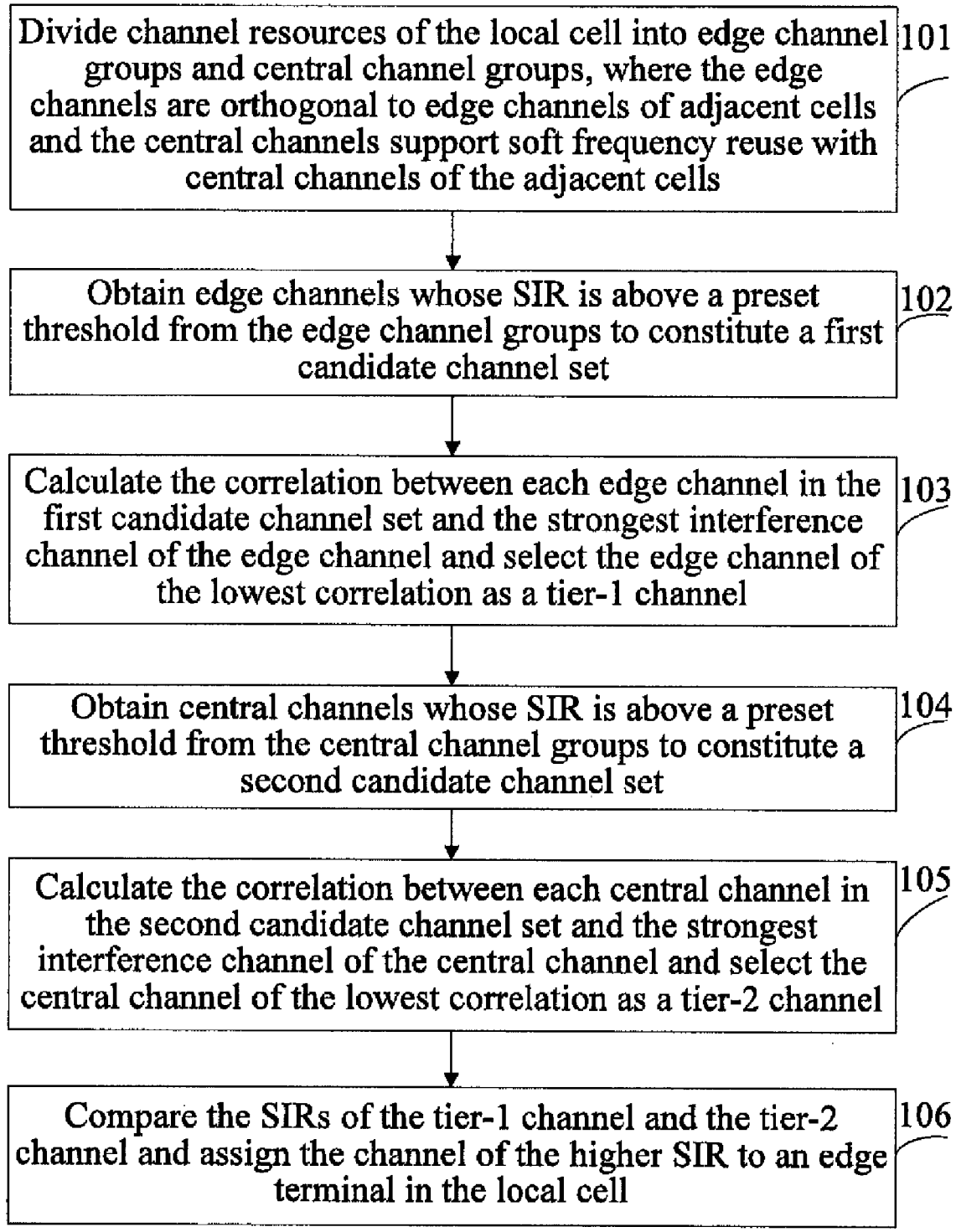
FIG. 1 is a flowchart of a method for suppressing ICI provided in an embodiment of the present invention.

FIG. 1 is a flowchart of a method for suppressing ICI provided in Embodiment 1 of the present invention. As shown in FIG. 1, the method includes:

101. Divide channel resources of the cell into edge channel group and central channel group, where the edge channels are orthogonal to edge channels of adjacent cells and the central channels use the same soft frequency as central channels of adjacent cells.

For example, in Embodiment 1 and the subsequent embodiments of the present invention, the channel resources of the cell are divided into the edge channel group and the central channel group of the cell according to the transmit power of the base station that serves the cell (hereinafter referred to as "serving base station"). Assuming the maximum transmit power of the serving base station of the cell is $P_{max}$, when the transmit power of the serving base station of the cell is in the range of $0$-$\alpha P_{max}$ ($0 \leq \alpha \leq 1$), the channel associated with the transmit power is grouped as a central channel; when the transmit power of the serving base station of the cell is in the range of $\alpha P_{max}$-$P_{max}$, the channel associated with the transmit power is grouped as an edge channel. The grouping of edge channels and central channels of the cell may be achieved by other means, for example, according to the distance and channel SIR.

102. Obtain edge channels whose SIR are above a preset threshold from the edge channel group to constitute a first candidate channel set.

The SIR of each edge channel in the edge channel group of the cell divided in step 101 may be calculated in advance.

For example, the SIR of each edge channel in the edge channel group may be calculated according to the local cell gain and adjacent cell gain on the edge channel and the transmit power used by the edge channels and central channels.

An edge terminal may detect the channel state information when reaching the serving base station of the local cell via each edge channel and the interference channel state information when reaching the serving base station of an adjacent cell via each edge channel; and report the detected channel state information and interference channel state information of each edge channel to the serving base station of the local cell.

The serving base station of the local cell may obtain the local cell gain on each edge channel according to the transmit power in the channel state information of the edge channel and the power when the channel state information of the edge channel is received.

Likewise, the serving base station of the local cell may obtain the adjacent cell gain on each edge channel according to the transmit power in the interference channel state information of the edge channel and the power when the interference channel state information of the edge channel is received.

It is common knowledge to those skilled in the art to calculate the SIR of each edge channel in the edge channel group according to the local cell gain and adjacent cell gain on the edge channel and the transmit power used by the edge channels and central channels. The specific implementation is described in subsequent embodiments of the present invention.

103. Calculate the correlation between each edge channel in the first candidate channel set and the strongest interference channel of the edge channel and select the edge channel of the lowest correlation as a tier-1 channel.

For example, step 103 may include:

combining the edge channels in the first candidate channel set into an edge channel matrix set and performing SVD on the edge channel matrix; and combining the strongest interference channels of the edge channels into an interference channel matrix set and performing SVD on the interference channel matrix;

obtaining the interference item between each edge channel and the strongest interference channel of the edge channel from the edge channel matrix and interference channel matrix after the SVD as a correlation coefficient; and selecting the edge channel of the smallest correlation coefficient as the tier-1 channel.

It should be noted that the serving base station of the local cell can detect the interference channels of multiple adjacent cells corresponding to each edge channel of the local cell and obtain the strongest interference channel. This is common knowledge to those skilled in the art. The strongest interference channel is the interference channel of the highest transmit power.

104. Obtain central channels whose SIR are above a preset threshold from the central channel group to constitute a second candidate channel set.

The SIR of each central channel in the central channel group of the cell divided in step 101 may be calculated in advance.

For example, the SIR of each central channel in the central channel group may be calculated according to the local cell gain and adjacent cell gain on the central channel and the transmit power used by the edge channels and central channels.

A central terminal may detect the channel state information when reaching the serving base station of the local cell via each central channel and the interference channel state information when reaching the serving base station of an adjacent cell via each central channel; and report the detected channel state information and interference state channel information of each central channel to the serving base station of the local cell.

The serving base station of the local cell may obtain the local cell gain on each central channel according to the transmit power in the channel state information of the central channel and the power when the channel state information of the central channel is received.

Likewise, the serving base station of the local cell may obtain the adjacent cell gain on each central channel according to the transmit power in the interference channel state information of the central channel and the power when the interference channel state information of the central channel is received.

105. Calculate the correlation between each central channel in the second candidate channel set and the strongest interference channel of the central channel and select the central channel of the lowest correlation as a tier-2 channel.

For example, step 105 may include:

combining the central channels in the second candidate channel set into a central channel matrix set and performing SVD on the central channel matrix; and combining the strongest interference channels of the central channels into an interference channel matrix set and performing SVD on the interference channel matrix;

obtaining the interference item between each central channel and the strongest interference channel of the central channel from the central channel matrix and interference channel matrix after the SVD as a correlation coefficient; and selecting the central channel of the smallest correlation coefficient as the tier-2 channel.

For example, if the number of central channel group is at least two, to prevent vicious contention for a same central channel between the serving base station of the local cell and the serving base station of an adjacent cell, different base stations may obtain central channels whose SIR are above the threshold from central channel group sorted in a certain sequence to constitute the second candidate channel set.

106. Compare the SIRs of the tier-1 channel and the tier-2 channel and assign the channel of the higher SIR to an edge terminal in the local cell.

For example, if the SIR of the tier-1 channel is higher than the SIR of the tier-2 channel, the base station may assign the tier-1 channel as the optimal channel to the edge terminal in the local cell. If the SIR of the tier-1 channel is not higher than the SIR of the tier-2 channel, the base station assigns the tier-2 channel to the edge terminal in the local cell as the optimal channel. When the SIR of the tier-1 channel equals the SIR of the tier-2 channel, the base station may assign the tier-1 channel or the tier-2 channel to the edge terminal in the local cell as the optimal channel.

After step 106, the method provided in the embodiment of the present invention may further include:

if the tier-1 channel is assigned to the edge terminal in the local cell, deleting the tier-1 channel from the first candidate channel set; and if the tier-2 channel is assigned to the edge terminal in the local cell, deleting the tier-2 channel from the second candidate channel set.

Deleting an assigned channel from the candidate channel set avoids the vicious contention for the same channel between multiple edge terminals. In addition, when there is more than one edge terminal, channels may be assigned according to the priority of each edge terminal. The edge terminals are prioritized according to the existing algorithms based on largest channel capacity, fairness, or lowest transmit power.

After step 106, the method provided in the embodiment of the present invention may further include:

precoding the transmitted data on the assigned channel to further reduce interference with other adjacent cells.

The precoding scheme may be the existing ½ coding scheme or ⅓ coding scheme.

The above describes the method for suppressing ICI provided in Embodiment 1 of the present invention. The central channels in the local cell use the same soft frequency as the central cells of the adjacent cells and the edge channels of the local cell are orthogonal to the edge channels of the adjacent cells. In the embodiment of the present invention, when the base station assigns a channel to an edge terminal, the base station looks for the optimal tier-1 channel from the edge channel group and looks for the optimal tier-2 channel from the central channels of the cell. The base station compares the performance of the tier-1 channel and the tier-2 channel and assigns the channel of better performance to the edge terminal. When suppressing ICI, the method provided in the embodiment of the present invention reduces the occurrences where central channels to be assigned to central terminals are not assigned to edge terminal when there are few or no central terminals, and thus the waste of channel resources is reduced.

Embodiment 2

Figure 2:
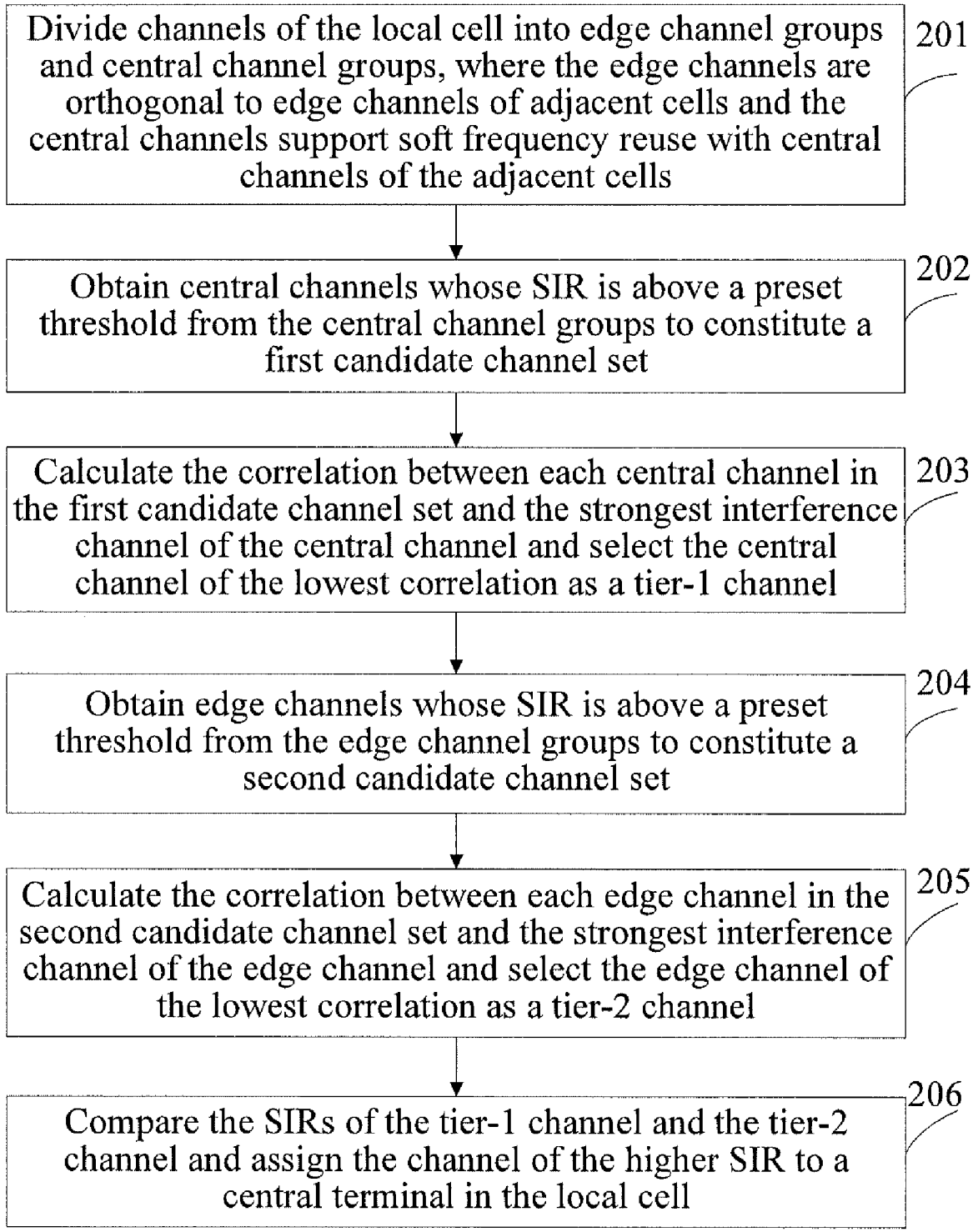
FIG. 2 is a flowchart of another method for suppressing ICI provided in an embodiment of the present invention.

FIG. 2 is a flowchart of a method for suppressing ICI provided in Embodiment 2 of the present invention. As shown in FIG. 2, the method includes:

Step 201 is the same as step 101 in Embodiment 1 of the present invention and thus not described here.

202. Obtain central channels whose SIR are above a preset threshold from the central channel group to constitute a first candidate channel set.

The SIR of each central channel in the central channel group of the cell divided in step 201 may be calculated in advance.

For example, the SIR of each central channel in the central channel group may be calculated according to the local cell gain and adjacent cell gain on the central channel and the transmit power used by the edge channels and central channels.

A central terminal may detect the channel state information when reaching the serving base station of the local cell via each central channel and the interference channel state information when reaching the serving base station of an adjacent cell via each central channel; and report the detected channel state information and interference state channel information of each central channel to the serving base station of the local cell.

The serving base station of the local cell may obtain the local cell gain on each central channel according to the transmit power in the channel state information of the central channel and the power when the channel state information of the central channel is received.

Likewise, the serving base station of the local cell may obtain the adjacent cell gain on each central channel according to the transmit power in the interference channel state information of the central channel and the power when the interference channel state information of the central channel is received.

For example, if the number of central channel group is at least two, to prevent vicious contention for a same central channel between the serving base station of the local cell and the serving base station of an adjacent cell, different base stations may obtain central channels whose SIR are above the threshold from central channel group sorted in a certain sequence to constitute the first candidate channel set.

203. Calculate the correlation between each central channel in the first candidate channel set and the strongest interference channel of the central channel and select the central channel of the lowest correlation as a tier-1 channel.

For example, step 203 may include:

combining the central channels in the first candidate channel set into a central channel matrix set and performing SVD on the central channel matrix; and combining the strongest interference channels of the central channels into an interference channel matrix set and performing SVD on the interference channel matrix;

obtaining the interference item between each central channel and the strongest interference channel of the central channel from the central channel matrix and interference channel matrix after the SVD as a correlation coefficient; and selecting the central channel of the smallest correlation coefficient as the tier-1 channel.

204. Obtain edge channels whose SIR are above a preset threshold from the edge channel group to constitute a second candidate channel set.

Step 204 is the same as step 102 in Embodiment 1 and thus not described here.

205. Calculate the correlation between each edge channel in the second candidate channel set and the strongest interference channel of the edge channel and select the edge channel of the lowest correlation as a tier-2 channel.

For example, step 205 may include:

combining the edge channels in the second candidate channel set into an edge channel matrix set and performing SVD on the edge channel matrix; and combining the strongest interference channels of the edge channels into an interference channel matrix set and performing SVD on the interference channel matrix;

obtaining the interference item between each edge channel and the strongest interference channel of the edge channel from the edge channel matrix and interference channel matrix after the SVD as a correlation coefficient; and selecting the edge channel of the smallest correlation coefficient as the tier-2 channel.

206. Compare the SIRs of the tier-1 channel and the tier-2 channel and assign the channel of the higher SIR to a central terminal in the local cell.

For example, if the SIR of the tier-1 channel is higher than the SIR of the tier-2 channel, the base station assigns the tier-1 channel as the optimal channel to the central terminal in the local cell. if the SIR of the tier-1 channel is not higher than the SIR of the tier-2 channel, the base station assigns the tier-2 channel to the central terminal in the local cell as the optimal channel. When the SIR of the tier-1 channel equals the SIR of the tier-2 channel, the base station may assign the tier-1 channel or the tier-2 channel to the central terminal in the local cell as the optimal channel.

After step 206, the method provided in the embodiment of the present invention may further include:

if the tier-1 channel is assigned to the central terminal in the local cell, deleting the tier-1 channel from the first candidate channel set; and if the tier-2 channel is assigned to the central terminal in the local cell, deleting the tier-2 channel from the second candidate channel set.

Deleting an assigned channel from the candidate channel set avoids the vicious contention for the same channel between multiple central terminals. In addition, when there is more than one central terminal, channels may be assigned according to the priority of each central terminal. The central terminals are prioritized according to the existing algorithms based on largest channel capacity, fairness, or lowest transmit power.

After step 206, the method provided in the embodiment of the present invention may further include:

precoding the transmitted data on the assigned channel to further reduce interference with other adjacent cells.

The precoding scheme may be the existing ½ coding scheme or ⅓ coding scheme.

The above describes the method for suppressing ICI provided in Embodiment 2 of the present invention. The central channels in the local cell use the same soft frequency as the central cells of the adjacent cells and the edge channels of the local cell are orthogonal to the edge channels of the adjacent cells. In the embodiment of the present invention, when the base station assigns a channel to a central terminal, the base station looks for the optimal tier-1 channel from the central channel group and looks for the optimal tier-2 channel from the edge channels of the cell. The base station compares the performance of the tier-1 channel and the tier-2 channel and assigns the channel of better performance to the central terminal. When suppressing ICI, the method provided in the embodiment of the present invention reduces the occurrences where edge channels to be assigned to edge terminals are not assigned to central terminals when there are few or no edge terminals, and thus the waste of channel resources is reduced.

Embodiment 3

Figure 3:
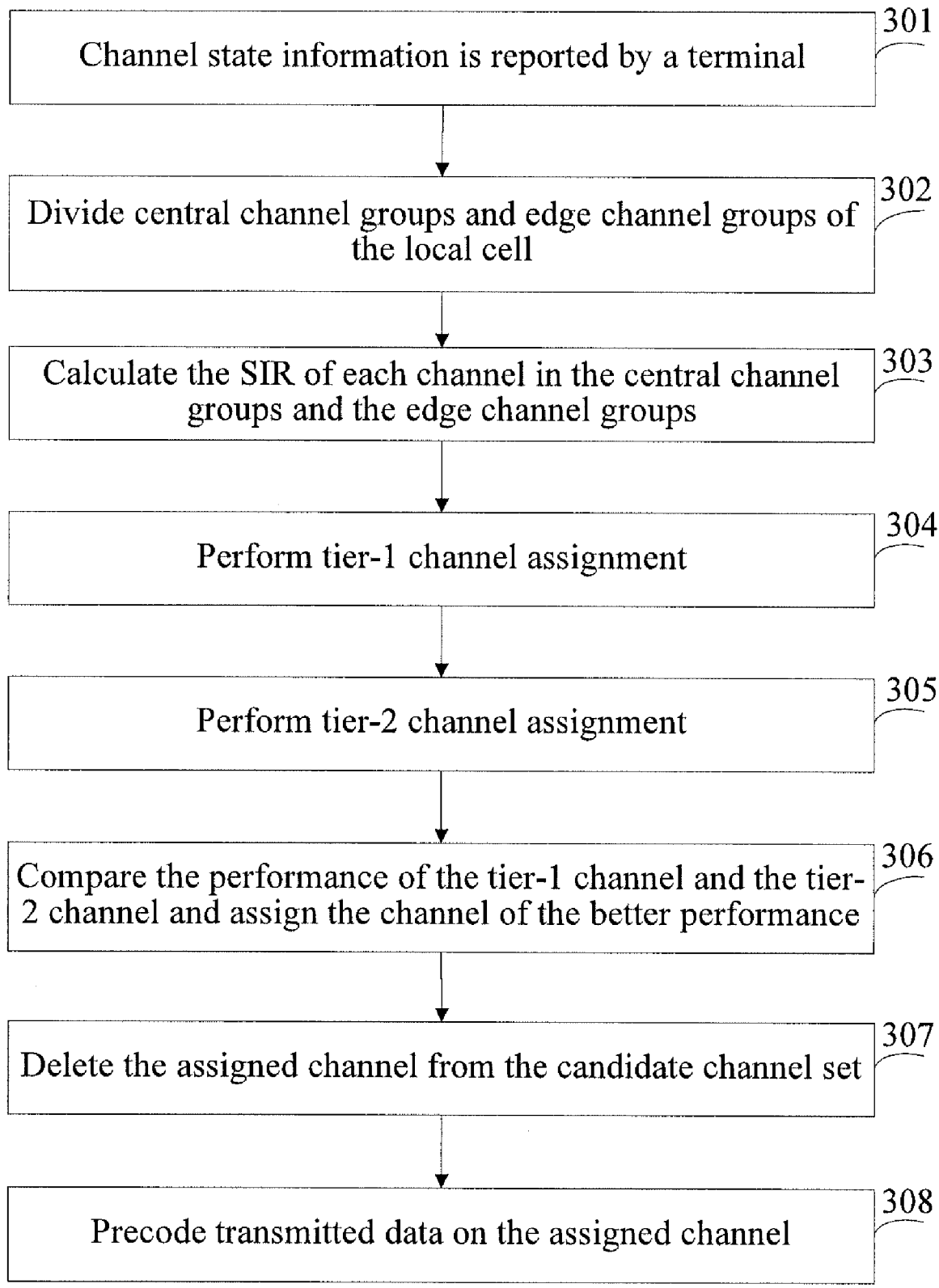
FIG. 3 is a flowchart of still another method for suppressing ICI provided in an embodiment of the present invention.

FIG. 3 is a flowchart of a method for suppressing ICI provided in Embodiment 3 of the present invention. As shown in FIG. 3, the method includes:

301. A terminal reports channel state information.

An edge terminal may detect the channel state information (CSI) when reaching the serving base station of the local cell via each edge channel and the interference channel state information (CSI-I) when reaching the serving base station of an adjacent cell via each edge channel; and report the CSI and CSI-I of each edge channel to the serving base station of the local cell.

Likewise, a central terminal may detect the CSI when reaching the serving base station of the local cell via each central channel and the CSI-I when reaching the serving base station of an adjacent cell via each central channel; and report the CSI and CSI-I of each central channel to the serving base station of the local cell.

Figure 4:
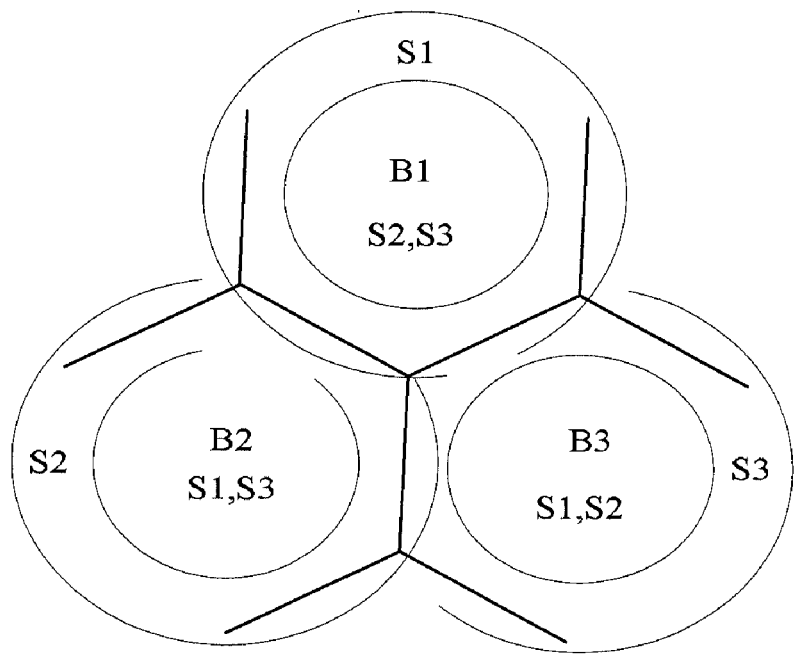
FIG. 4 is a schematic diagram of a multi-cell model provided in an embodiment of the present invention.

FIG. 4 is a schematic diagram of a multi-cell model provided in Embodiment 3 of the present invention. As shown in FIG. 4, B1 is the serving base station of the local cell; B2 and B3 are serving base stations of adjacent cells. An edge terminal k in the local cell can detect the CSI when reaching base station B1 via each edge channel and the CSI-I when reaching B2 and B3 via each edge channel; the edge terminal k reports the detected CSI and CSI-I to B1.

302. Divide central channel group and edge channel group of the local cell.

As shown in FIG. 4, the round area in the center of a cell indicates the central area of the cell and the other area is the edge area of the cell. Channels of the central area are central channels and channels of the edge area are edge channels. The central channel group and edge channel group of B1 are described in Table 1.

TABLE 1

| Edge Channel Group | Central Channel Group |
| --- | --- |
| S1 | S2, S3 |

For example, the central channel group and edge channel group of the local cell may be divided according to the transmit power of B1. Assuming the maximum transmit power of B1 is $P_{max}$, when the transmit power of B1 is in the range of $0$-$\alpha P_{max}$ ($0 \leq \alpha \leq 1$), the channel associated with the transmit power is grouped as a central channel; when the transmit power of B1 is in the range of $\alpha P_{max}$-$P_{max}$, the channel associated with the transmit power is grouped as an edge channel. The grouping of edge channels and central channels of the cell may be implemented by other means, for example, according to the distance and channel SIR.

303. Calculate the SIR of each channel in the central channel group and the edge channel group.

For example, B1 may obtain the local cell gain $g_i$ on each edge channel according to the transmit power in the CSI of the edge channel reported by the edge terminal and the power when the CSI is received.

B1 may obtain the adjacent cell gain $g_i$ on each edge channel according to the transmit power in the CSI-I of the edge channel reported by the edge terminal and the power when the CSI-I is received.

Likewise, B1 may obtain the local cell gain $g_i$ on each central channel according to the transmit power in the CSI of the central channel reported by the central terminal and the power when the CSI is received.

B1 may obtain the adjacent cell gain $g_i$ on each central channel according to the transmit power in the CSI-I of the central channel reported by the central terminal and the power when the CSI-I is received.

Based on the local cell gain $g_i$ and adjacent cell gain $g_j$ of the central channels and edge channels, the transmit power $\alpha P_{max}$ ($0 \leq \alpha \leq 1$) used by edge channels, and the transmit power $P_{max}$ used by central channels, the SIRs of channels in the central channel group and the edge channel group are calculated according to the following formula:

$$SIR = \frac{g_i P_i}{\sum_{j \in S_c} \alpha P_{max} g_j + \sum_{j \in S_e} P_{max} g_j} \quad (1)$$

In the formula, $g_i$ is the local cell gain, $g_j$ is the adjacent cell gain, $P_i$ is the transmit power used by B1 for an edge terminal i or central terminal i of the local cell, j indicates the number of adjacent base stations, $S_c$ indicates a central channel group, and $S_e$ indicates an edge channel group. After the SIRs of channels in the central channel group and edge channel group are calculated, an SIR table shown in Table 2 may be created.

TABLE 2

| SIR of Channel Group S1 | | SIR of Channel Group S2 | | SIR of Channel Group S3 | |
|---|---|---|---|---|---|
| Channel 1 | ... Channel n1 | Channel n1 + 1 | ... Channel n1 + n2 | Channel n1 + n2 + 1 | ... Channel n1 + n2 + n3 |
| SIR1 | ... SIRn1 | SIRn1 + 1 | SIRn1 + n2 | SIRn1 + n2 + 1 | SIRn1 + n2 + n3 |

304. Perform tier-1 channel assignment.

A. Select available channels whose SIR are above a preset threshold from $S_1$ to constitute a candidate channel set $Te_1$ for the edge terminal k of B1. Channels in $Te_1$ adopt a good modulation and coding scheme.

B. Select an edge channel of the smallest correlation coefficient with the strongest interference channel from $Te_1$ as the tier-1 channel ($C_k^1$) for assignment.

For example, if $H_{i,m}^k$ indicates the channel matrix set of a terminal k in the local cell (including edge terminal k and central terminal k) on subcarrier m of base station i, after SVD is performed on the channel matrix, the following equation is obtained:

$$H_{i,m}^k = U \Lambda V^H = u_{i,m}^k \lambda_{i,m}^k v_{i,m}^k \qquad (2)$$

In the equation, u and v are the feature matrix and $\lambda$ is the feature value. In the case of equal power assignment, the signal received by the terminal k in the local cell is the superposition of signals transmitted by multiple base stations on the same subcarrier m. The superposed signal can be expressed by $y_m^k$:

$$y_m^k = \sum_{j=1}^{M} H_{j,m}^k x_{j,m}^k + z_m = \sum_{j=1}^{M} u_{j,m}^k \lambda_{j,m}^k x_{j,m}^k + z_m \qquad (3)$$

M is the number of base stations; when $i \neq j$, $H_{j,m}^k$ is an interference channel matrix set constituted by strongest interference channels of all channels (including edge channels and central channels) in the channel matrix $H_{i,m}^k$; $z_m$ is the additive white Gaussian noise (AWGN) with the variance $\sigma^2$. After SVD, $u_{j,m}^k \lambda_{j,m}^k$ is obtained from the interference channel matrix $H_{j,m}^k$, where $u_{j,m}^k$ may be regarded as the signature of the terminal k on the subcarrier m. The signal received by the terminal k in the local cell carries an interference signal $$\sum_{j=1, j \neq i}^{M} u_{i,m}^k u_{j,m}^k.$$

Therefore, the correlation coefficient between a channel in the channel matrix $H_{i,m}^k$, and the strongest interference channel associated with the channel is defined as:

$$\gamma_{i,j}^k = u_{i,m}^k u_{j,m}^k \qquad (4)$$

When the tier-1 channel is selected from the candidate channel set, the correlation coefficient $\gamma_{i,j}^k$ between the selected channel and the strongest interference channel must be the smallest.

C. For the central terminal k of base station B1, to prevent vicious contention for one central channel between B1 and adjacent base stations B2 and B3, different base stations assign central channels in different sequences. B1 selects available channels whose SIR are above a preset threshold from the SIR table in the sequence of (S2, S3); B2 selects available channels whose SIR are above the preset threshold from the SIR table in the sequence of (S3, S1); B3 selects available channels whose SIR are above the preset threshold from the SIR table in the sequence of (S1, S2)

D. Select an edge channel of the smallest correlation coefficient with the strongest interference channel from $Tc_1$ as the tier-1 channel ($C_k^1$) for assignment.

The implementation of step D is the same as that of step B.

305. Perform tier-2 channel assignment.

E. The edge terminal receives strong interference and the central terminal receives weak interference. Therefore, tier-2 channel assignment is performed early for the edge terminal and late for the central terminal.

For the edge terminal k of B1, the optimal channel is assigned from the central channel group $S_2$ and $S_3$ as the tier-2 channel $C_k^2$. The assignment is implemented in the same way as the tier-1 channel assignment.

For the central terminal k of B1, the optimal channel is assigned from the edge channel group $S_1$ as the tier-2 channel $C_k^2$. The assignment is implemented in the same way as the tier-1 channel assignment. The performance (such as SIR) of $C_k^1$ is compared with the performance of $C_k^2$ and the channel of better performance is assigned to the central terminal k as the finally assigned channel $C_k$.

306. Compare the performance of the tier-1 channel and the tier-2 channel and assign the channel of better performance.

The performance (such as SIR) of $C_k^1$ is compared with the performance of $C_k^2$ and the channel of better performance is assigned to the edge terminal k or central terminal k as the finally assigned channel $C_k$.

307. Delete the assigned channel from the candidate channel set.

If the tier-1 channel $C_k^1$ is assigned to the edge terminal k in the local cell, delete the tier-1 channel $C_k^1$ from the first candidate channel set.

If the tier-2 channel $C_k^2$ is assigned to the edge terminal k in the local cell, delete the tier-2 channel $C_k^2$ from the second candidate channel set.

Deleting an assigned channel from the candidate channel set avoids the vicious contention for the same channel between multiple edge terminals. In addition, when there is more than one edge terminal, channels may be assigned according to the priority of each edge terminal. The edge terminals are prioritized according to the existing algorithms based on largest channel capacity, fairness, or lowest transmit power.

308. Precode transmitted data on the assigned channel.

This further reduces interference with adjacent cells. The precoding scheme may be the existing ½ coding scheme or ⅓ coding scheme.

The above describes the method for suppressing ICI provided in Embodiment 3 of the present invention. The central channels in the local cell use the same soft frequency as the central cells of the adjacent cells and the edge channels of the local cell are orthogonal to the edge channels of the adjacent cells. In Embodiment 3, when the base station assigns a channel to an edge terminal, the base station looks for the optimal tier-1 channel from the edge channel group and further looks for the optimal tier-2 channel from the central channels of the cell; the base station compares the performance of the tier-1 channel and the tier-2 channel and assigns the channel of better performance to the edge terminal. Likewise, when the base station assigns a channel to a central terminal, the base station looks for the optimal tier-1 channel from the central channel group and further looks for the optimal tier-2 channel from the edge channels of the cell; the base station compares the performance of the tier-1 channel and the tier-2 channel and assigns the channel of better performance to the central terminal. When suppressing ICI, the method in Embodiment 3 of the present invention reduces the occurrences where edge channels to be assigned to edge terminals are not assigned to central terminals when there are few or no edge terminals and the occurrences where central channels to be assigned to central terminals are not assigned to edge terminals when there are few or no central terminals, and thus the waste of channel resources is reduced.

Embodiment 4

Figure 5:
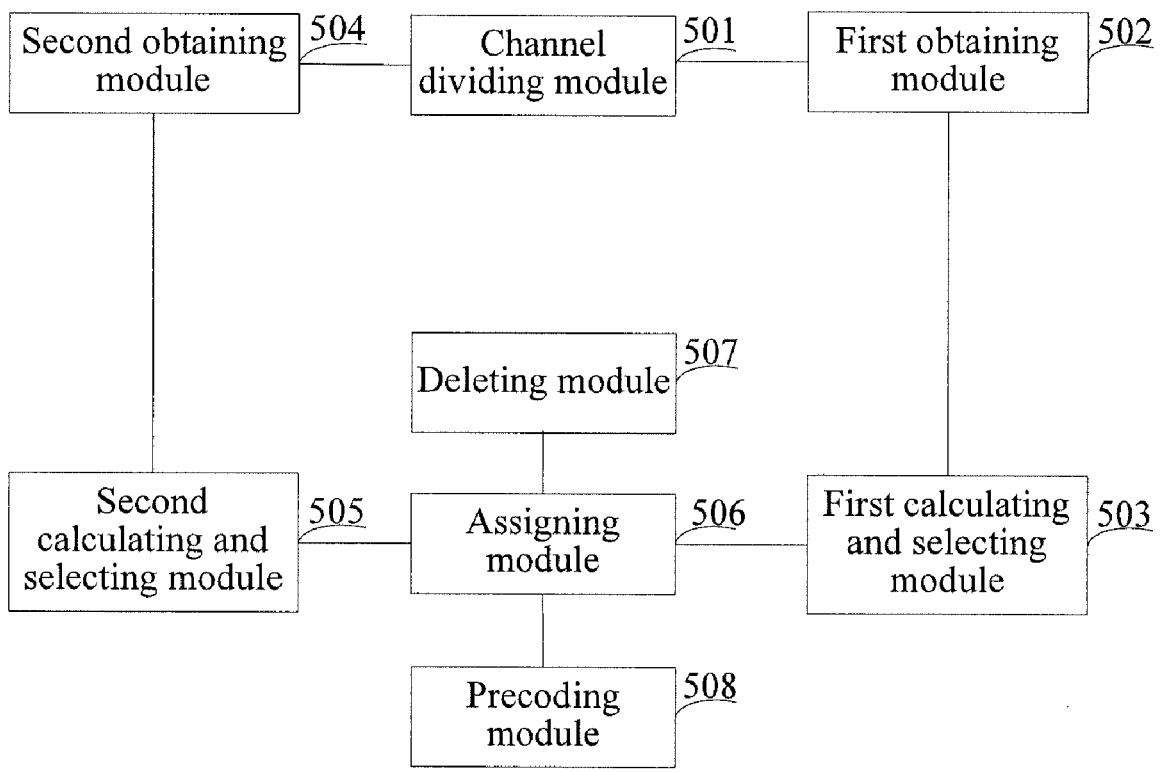
FIG. 5 shows a structure of an apparatus for suppressing ICI provided in an embodiment of the present invention.

FIG. 5 shows a structure of an apparatus for suppressing ICI provided in Embodiment 4 of the present invention. The apparatus for suppressing ICI provided in Embodiment 4 of the present invention may be a standalone apparatus or a component of a base station and adapted to implement ICI suppression. As shown in FIG. 5, the apparatus includes: a channel dividing module 501, a first obtaining module 502, a first calculating and selecting module 503, a second obtaining module 504, a second calculating and selecting module 505, and an assigning module 506.

The channel dividing module 501 is adapted to divide channels of the local cell into edge channel group and central channel group, where the edge channels are orthogonal to edge channels of adjacent cells and the central channels use the same soft frequency as central channels of adjacent cells.

The channel dividing module 501 may divide edge channel group and central channel group of the local cell according to the transmit power of the serving base station of the local cell. Assuming the maximum transmit power of the serving base station of the cell is $P_{max}$, when the transmit power of the serving base station of the cell is in the range of $0$-$\alpha P_{max}$ ($0 \leq \alpha \leq 1$), the channel associated with the transmit power is grouped as a central channel; when the transmit power of the serving base station of the cell is in the range of $\alpha P_{max}$-$P_{max}$, the channel associated with the transmit power is grouped as an edge channel.

The first obtaining module 502 is adapted to obtain edge channels whose SIR are above a preset threshold from the edge channel group to constitute a first candidate channel set, where the edge channels are orthogonal to edge channels of the adjacent cells.

The first calculating and selecting module 503 is adapted to calculate the correlation between each edge channel in the first candidate channel set and the strongest interference channel of the edge channel and select the edge channel of the lowest correlation as a tier-1 channel.

Figure 6:
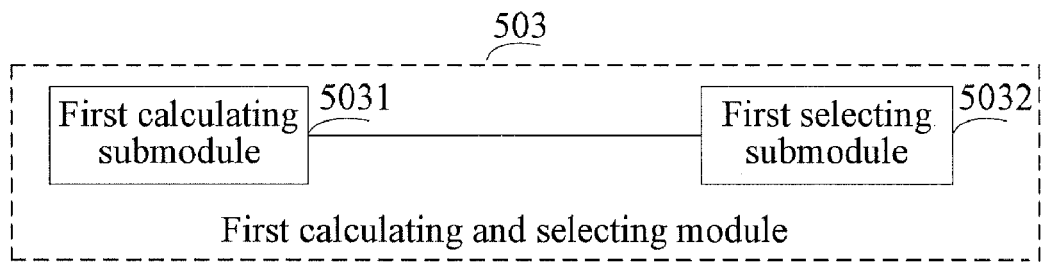
FIG. 6 shows a structure of a first calculating and selecting module provided in an embodiment of the present invention.

FIG. 6 shows a structure of the first calculating and selecting module provided in Embodiment 4 of the present invention. As shown in FIG. 6, the first calculating and selecting module 503 includes:

a first calculating submodule 5031, adapted to: combine edge channels in the first candidate channel set into an edge channel matrix set, combine strongest interference channels of the edge channels into an interference channel matrix set, and perform SVD on the edge channel matrix and the interference channel matrix; and obtain an interference item between each edge channel and its corresponding strongest interference channel as a correlation coefficient; and a first selecting submodule 5032, adapted to select the edge channel of the smallest correlation coefficient as the tier-1 channel.

The second obtaining module 504 is adapted to obtain central channels whose SIR are above a preset threshold from the central channel group to constitute a second candidate channel set, where the central channels use the same soft frequency as central channels of the adjacent cells.

The second calculating and selecting module 505 is adapted to calculate the correlation between each central channel in the second candidate channel set and the strongest interference channel of the central channel and select the central channel of the lowest correlation as a tier-2 channel.

Figure 7:
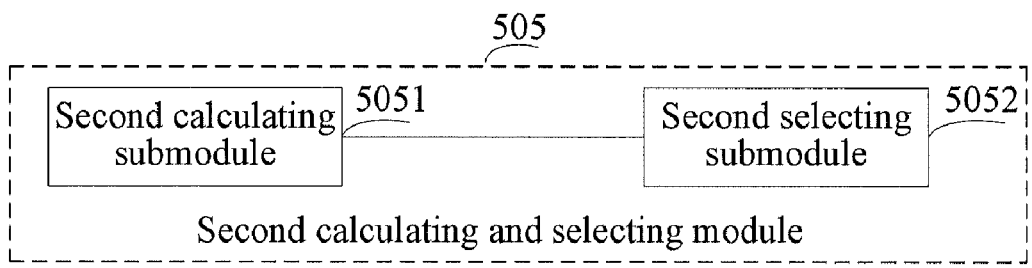
FIG. 7 shows a structure of a second calculating and selecting module provided in an embodiment of the present invention.

FIG. 7 shows a structure of the second calculating and selecting module provided in Embodiment 4 of the present invention. As shown in FIG. 7, the second calculating and selecting module 505 includes:

a second calculating submodule 5051, adapted to: combine central channels in the second candidate channel set into a central channel matrix set, combine strongest interference channels of the central channels into an interference channel matrix set, and perform SVD on the central channel matrix and the interference channel matrix; and obtain an interference item between each central channel and its corresponding strongest interference channel as a correlation coefficient; and a second selecting submodule 5052, adapted to select the central channel of the smallest correlation coefficient as the tier-2 channel.

The assigning module 506 is adapted to compare the SIRs of the tier-1 channel and the tier-2 channel and assign the channel of the higher SIR to an edge terminal in the local cell.

In addition, when there is more than one edge terminal, the assigning module 506 may assign channels according to the priority of each edge terminal. The edge terminals are prioritized according to the existing algorithms based on largest channel capacity, fairness, or lowest transmit power.

Figure 8:
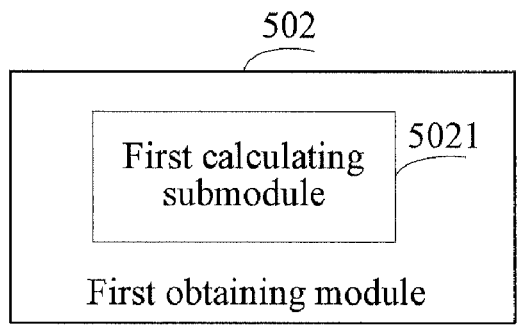
FIG. 8 shows a structure of a first obtaining module provided in an embodiment of the present invention.

As shown in FIG. 8, the first obtaining module 502 provided in Embodiment 4 of the present invention may further include:

a first calculating submodule 5021, adapted to calculate the SIR of each edge channel according to the local cell gain and adjacent cell gain on the edge channel and the transmit power used by the edge channels and central channels.

Figure 9:
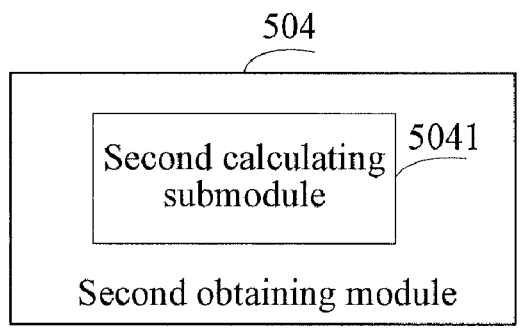
FIG. 9 shows a structure of a second obtaining module provided in an embodiment of the present invention.

As shown in FIG. 9, the second obtaining module 504 provided in Embodiment 4 of the present invention may further include:

a second calculating submodule 5041, adapted to calculate the SIR of each central channel according to the local cell gain and adjacent cell gain on the central channel and the transmit power used by the edge channels and central channels.

For example, the first calculating submodule 5021 may calculate the SIR of each edge channel in the edge channel group of the local cell divided by the channel dividing module 501 in advance so that the first obtaining module 502 can obtain the SIR of each edge channel directly from the first calculating submodule 5021 thereof. Likewise, the second calculating submodule 5041 may calculate the SIR of each central channel in the central channel group of the local cell divided by the channel dividing module 501 in advance so that the second obtaining module 504 can obtain the SIR of each central channel directly from the second calculating submodule 5041 thereof.

The SIR of each edge channel is calculated according to the local cell gain and adjacent cell gain on the edge channel and the transmit power used by the edge channels and central channels.

The SIR of each central channel is calculated according to the local cell gain and adjacent cell gain on the central channel and the transmit power used by the edge channels and central channels.

It is common knowledge to those skilled in the art to calculate the SIR of each edge channel in the edge channel group according to the local cell gain and adjacent cell gain on the edge channel and the transmit power used by the edge channels and central channels.

As shown in FIG. 5, the apparatus for suppressing ICI provided in Embodiment 4 of the present invention may further include:

a deleting module 507, adapted to delete the tier-1 channel from the first candidate channel set after the assigning module 506 assigns the tier-1 channel to an edge terminal in the local cell; or adapted to delete the tier-2 channel from the second candidate channel set after the assigning module 506 assigns the tier-2 channel to an edge terminal in the local cell.

Deleting an assigned channel from the candidate channel set avoids the vicious contention for the same channel between multiple edge terminals.

As shown in FIG. 5, the apparatus for suppressing ICI provided in Embodiment 4 of the present invention may further include: a precoding module 508, adapted to precode the transmitted data on the channel assigned by the assigning module 506 to the edge terminal in the local cell. This further reduces the interference with adjacent cells. The precoding scheme may be the existing ½ coding scheme or ⅓ coding scheme.

The central channels of the local cell divided by the apparatus for suppressing ICI provided in Embodiment 4 of the present invention use the same soft frequency as the central channels of the adjacent cells; the edge channels of the local cell are orthogonal to the edge channels of the adjacent cells. When the apparatus assigns a channel to an edge terminal, the apparatus looks for the optimal tier-1 channel from the edge channel group and looks for the optimal tier-2 channel from the central channels of the cell. The apparatus compares the performance of the tier-1 channel and the tier-2 channel and assigns the channel of better performance to the edge terminal. When suppressing ICI, the apparatus provided in the embodiment of the present invention reduces the occurrences where central channels to be assigned to central terminals are not assigned to edge terminals when there are few or no central terminals, and thus the waste of channel resources is reduced.

Embodiment 5

The apparatus for suppressing ICI provided in Embodiment 5 of the present invention has the same structure as the apparatus shown in FIG. 5 and is adapted to assign channels to central terminals in the local cell. The apparatus includes: a channel dividing module 501, a first obtaining module 502, a first calculating and selecting module 503, a second obtaining module 504, a second calculating and selecting module 505, and an assigning module 506.

The channel dividing module 501 is adapted to divide channels of the local cell into edge channel group and central channel group, where the edge channels are orthogonal to edge channels of adjacent cells and the central channels use the same soft frequency as central channels of the adjacent cells.

The first obtaining module 502 is adapted to obtain central channels whose SIR are above a preset threshold from the central channel group to constitute a first candidate channel set, where the central channels use the same soft frequency as central channels of the adjacent cells.

The first calculating and selecting module 503 is adapted to calculate the correlation between each central channel in the first candidate channel set and the strongest interference channel of the central channel and select the central channel of the lowest correlation as a tier-1 channel.

The first calculating and selecting module 503 provided in Embodiment 5 of the present invention may have the same structure as that shown in FIG. 6. The module 503 includes:

a first calculating submodule 5031, adapted to: combine central channels in the first candidate channel set into a central channel matrix set, combine strongest interference channels of the central channels into an interference channel matrix set, and perform SVD on the central channel matrix and the interference channel matrix; and obtain an interference item between each central channel and its corresponding strongest interference channel as a correlation coefficient; and a first selecting submodule 5032, adapted to select the central channel of the smallest correlation coefficient as the tier-1 channel.

The second obtaining module 504 is adapted to obtain edge channels whose SIR are above a preset threshold from the edge channel group to constitute a second candidate channel set, where the edge channels are orthogonal to edge channels of the adjacent cells.

The second calculating and selecting module 505 is adapted to calculate the correlation between each edge channel in the second candidate channel set and the strongest interference channel of the edge channel and select the edge channel of the lowest correlation as a tier-2 channel.

The second calculating and selecting module 505 provided in Embodiment 5 of the present invention may have the same structure as that shown in FIG. 7. The module 505 includes:

a second calculating submodule 5051, adapted to: combine edge channels in the second candidate channel set into an edge channel matrix set, combine strongest interference channels of the edge channels into an interference channel matrix set, and perform SVD on the edge channel matrix and the interference channel matrix; and obtain an interference item between each edge channel and its corresponding strongest interference channel as a correlation coefficient; and a second selecting submodule 5052, adapted to select the edge channel of the smallest correlation coefficient as the tier-2 channel.

The assigning module 506 is adapted to compare the SIRs of the tier-1 channel and the tier-2 channel and assign the channel of the higher SIR to a central terminal in the local cell.

The first obtaining module 502 provided in Embodiment 5 of the present invention may have the same structure as that shown in FIG. 8 and further include a first calculating submodule 5021, adapted to calculate the SIR of each edge channel in the edge channel group according to the local cell gain and adjacent cell gain on the edge channel and the transmit power used by the edge channels and central channels.

The second obtaining module 504 provided in Embodiment 5 of the present invention may have the same structure as that shown in FIG. 9 and further include a second calculating submodule 5041, adapted to calculate the SIR of each central channel in the central channel group according to the local cell gain and adjacent cell gain on the central channel and the transmit power used by the edge channels and central channels.

The apparatus for suppressing ICI provided in Embodiment 5 of the present invention may further include a deleting module 507 shown in FIG. 5, adapted to delete the tier-1 channel from the first candidate channel set after the assigning module 506 assigns the tier-1 channel to the central terminal in the local cell.

Or the deleting module is adapted to delete the tier-2 channel from the second candidate channel set after the assigning module 506 assigns the tier-2 channel to the central terminal in the local cell.

The apparatus for suppressing ICI provided in Embodiment 5 of the present invention may further include a precoding module 508 shown in FIG. 5, adapted to precode the transmitted data on the channel assigned by the assigning module 506 to the central terminal in the local cell.

The apparatus for suppressing ICI provided in Embodiment 5 of the present invention may be a standalone apparatus or be a component of the base station adapted to implement channel assignment for the central terminal in the local cell; or the function of the apparatus for suppressing ICI provided in Embodiment 5 of the present invention may be another function of the apparatus for suppressing ICI provided in Embodiment 4 of the present invention. Thus, one apparatus for suppressing ICI may assign channels to both edge terminals and central terminals in the local cell.

The central channels of the local cell divided by the apparatus for suppressing ICI provided in Embodiment 5 of the present invention use the same soft frequency as the central channels of the adjacent cells; the edge channels of the local cell are orthogonal to the edge channels of the adjacent cells. When the apparatus assigns a channel to a central terminal, the apparatus looks for the optimal tier-1 channel from the central channel group and looks for the optimal tier-2 channel from the edge channels of the cell. The apparatus compares the performance of the tier-1 channel and the tier-2 channel and assigns the channel of better performance to the central terminal. When suppressing ICI, the apparatus provided in the embodiment of the present invention reduces the occurrences where edge channels to be assigned to edge terminals are not assigned to central terminals when there are few or no edge terminals, and thus the waste of channel resources is reduced.

Embodiment 6

Figure 10:
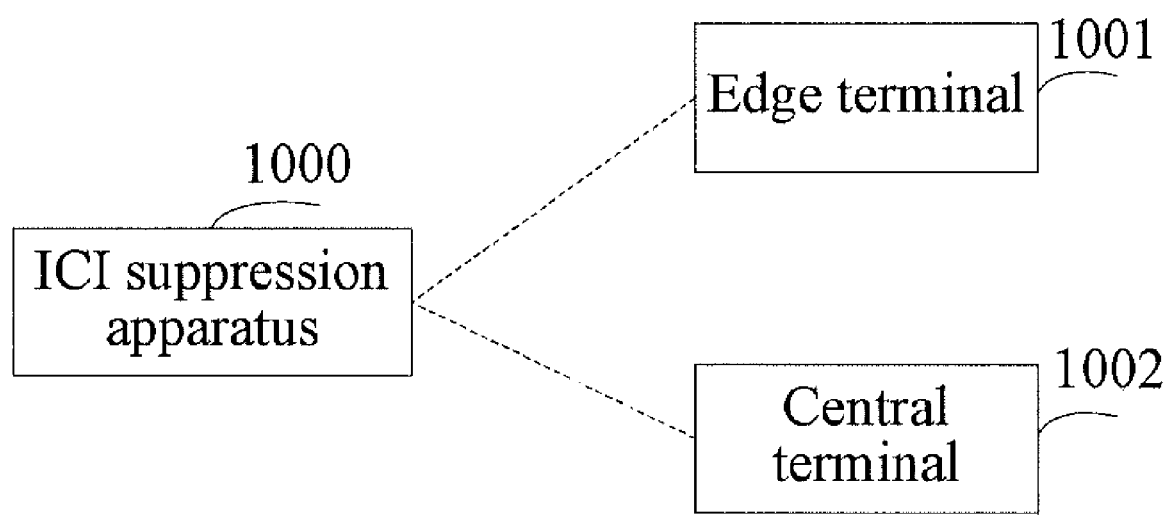
FIG. 10 shows a structure of a system for suppressing ICI provided in an embodiment of the present invention.

FIG. 10 shows a structure of a system for suppressing ICI provided in Embodiment 6 of the present invention. As shown in FIG. 10, the system includes:

an apparatus for suppressing ICI 1000, connected to an edge terminal 1001 in the local cell in a communicable mode as shown in the broken line; and adapted to:

divide channels of the local cell into edge channel group and central channel group, where the edge channels are orthogonal to edge channels of adjacent cells and the central channels use the same soft frequency as central channels of the adjacent cells;

obtain edge channels whose SIR are above a preset threshold from the edge channel group to constitute a first candidate channel set; calculate the correlation between each edge channel in the first candidate channel set and the strongest interference channel of the edge channel and select the edge channel of the lowest correlation as a tier-1 channel;

obtain central channels whose SIR are above a preset threshold from the central channel group to constitute a second candidate channel set; calculate the correlation between each central channel in the second candidate channel set and the strongest interference channel of the central channel and select the central channel of the lowest correlation as a tier-2 channel; and compare the SIRs of the tier-1 channel and the tier-2 channel and assign the channel of the higher SIR to the edge terminal 1001 in the local cell.

As shown in FIG. 10, the apparatus for suppressing ICI 1000 may also be connected to a central terminal 1002 in the local cell in a communicable mode as shown in the broken line; and adapted to:

obtain central channels whose SIR are above a preset threshold from the central channel group to constitute a first candidate channel set; calculate the correlation between each central channel in the first candidate channel set and the strongest interference channel of the central channel and select the central channel of the lowest correlation as a tier-1 channel;

obtain edge channels whose SIR are above a preset threshold from the edge channel group to constitute a second candidate channel set; calculate the correlation between each edge channel in the second candidate channel set and the strongest interference channel of the edge channel and select the edge channel of the lowest correlation as a tier-2 channel; and compare the SIRs of the tier-1 channel and the tier-2 channel and assign the channel of the higher SIR to the central terminal 1002 in the local cell.

After comparing the SIRs of the tier-1 channel and the tier-2 channel and assigning the channel of the higher SIR to the edge terminal and/or central terminal in the local cell, the apparatus for suppressing ICI 1000 may further delete the assigned channel from the corresponding candidate channel set.

If the tier-1 channel is assigned to the edge terminal in the local cell, the apparatus for suppressing ICI 1000 deletes the tier-1 channel from the first candidate channel set.

If the tier-2 channel is assigned to the edge terminal in the local cell, the apparatus for suppressing ICI 1000 deletes the tier-2 channel from the second candidate channel set.

Deleting an assigned channel from the candidate channel set avoids the vicious contention for the same channel between multiple edge terminals.

In addition, when there is more than one edge terminal, the apparatus for suppressing ICI 1000 may assign channels according to the priority of each edge terminal. The edge terminals are prioritized according to the existing algorithms based on largest channel capacity, fairness, or lowest transmit power.

After comparing the SIRs of the tier-1 channel and the tier-2 channel and assigning the channel of the higher SIR to the edge terminal and/or central terminal in the local cell, the apparatus for suppressing ICI 100 may further precode the transmitted data on the assigned channel. This further reduces the interference with adjacent cells. The precoding scheme may be the existing ½ coding scheme or ⅓ coding scheme.

The central channels of the local cell divided by the system for suppressing ICI provided in Embodiment 6 of the present invention use the same soft frequency as the central channels of the adjacent cells; the edge channels of the local cell are orthogonal to the edge channels of the adjacent cells. In the embodiment, when the system assigns a channel to an edge terminal, the system looks for the optimal tier-1 channel from the edge channel group and further looks for the optimal tier-2 channel from the central channels of the cell; the system compares the performance of the tier-1 channel and the tier-2 channel and assigns the channel of better performance to the edge terminal. Likewise, when the system assigns a channel to a central terminal, the system looks for the optimal tier-1 channel from the central channel group and further looks for the optimal tier-2 channel from the edge channels of the cell; the system compares the performance of the tier-1 channel and the tier-2 channel and assigns the channel of better performance to the central terminal. When suppressing ICI, the system in Embodiment 6 of the present invention reduces the occurrences where edge channels to be assigned to edge terminals are not assigned to central terminals when there are few or no edge terminals and the occurrences where central channels to be assigned to central terminals are not assigned to edge terminals when there are few or no central terminals, and thus the waste of channel resources is reduced.

Persons having ordinary skill in the art should understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a read-only memory (ROM), a random access memory (RAM), a magnetic disk, or a compact disk read-only memory (CD-ROM).

Persons having ordinary skill in the art can make variations and modifications to the present invention in terms of the specific implementations and application scopes according to the ideas of the present invention. Therefore, the specifications shall not be construed as limitations to the present invention.

What is claimed is:

1. A method for suppressing inter-cell interference, comprising:
    obtaining edge channels whose signal interference ratio (SIR) are above a first preset threshold from one or more edge channel groups to constitute a first candidate channel set, wherein the edge channels are orthogonal to edge channels of adjacent cells;
    calculating a correlation between each edge channel in the first candidate channel set and a strongest interference channel of the edge channel and selecting an edge channel of the lowest correlation as a tier-1 channel;
    obtaining central channels whose SIR are above a second preset threshold from one or more central channel groups to constitute a second candidate channel set, wherein the central channels use the same soft frequency as central channels of the adjacent cells;
    calculating a correlation between each central channel in the second candidate channel set and a strongest interference channel of the central channel and selecting a central channel of the lowest correlation as a tier-2 channel; and
    comparing SIRs of the tier-1 channel and the tier-2 channel and assigning the channel of a higher SIR to an edge terminal in the cell which the edge terminal accessed.

2. The method of claim 1, before the step of obtaining edge channels whose SIR are above a first preset threshold from one or more edge channel groups to constitute a first candidate channel set, further comprising:
    calculating the SIR of each edge channel in the one or more edge channel groups according to the terminal accessed cell gain and an adjacent cell gain on the edge channel and transmit power separately used by edge channels and central channels; and
    calculating the SIR of each central channel in the one or more central channel groups according to a terminal accessed cell gain and an adjacent cell gain on the central channel and transmit power separately used by edge channels and central channels.

3. The method of claim 1, wherein the step of calculating a correlation between each edge channel in the first candidate channel set and a strongest interference channel of the edge channel and selecting an edge channel of the lowest correlation as a tier-1 channel comprises:
    combining edge channels in the first candidate channel set into an edge channel matrix set, combining strongest interference channels of the edge channels into an interference channel matrix set, and performing singular value decomposition (SVD) separately on the edge channel matrix and the interference channel matrix;
    obtaining an interference item between each edge channel and its corresponding strongest interference channel as a correlation coefficient; and
    selecting an edge channel of the smallest correlation coefficient as the tier-1 channel.

4. The method of claim 1, wherein the step of calculating a correlation between each central channel in the second candidate channel set and a strongest interference channel of the central channel and selecting a central channel of the lowest correlation as a tier-2 channel comprises:
    combining central channels in the second candidate channel set into a central channel matrix set, combining strongest interference channels of the central channels into an interference channel matrix set, and performing singular value decomposition (SVD) separately on the central channel matrix and the interference channel matrix;
    obtaining an interference item between each central channel and its corresponding strongest interference channel as a correlation coefficient; and
    selecting a central channel of the smallest correlation coefficient as the tier-2 channel.

5. The method of claim 1, further comprising:
    obtaining central channels whose SIR are above the second threshold according to the sequence of the central channel group to constitute the second candidate channel set if the number of the central channel group is at least two.

6. The method of claim 1, after the step of comparing the SIRs of the tier-1 channel and the tier-2 channel and assigning the channel of a higher SIR to an edge terminal in a terminal accessed cell, further comprising:
    deleting the tier-1 channel from the first candidate channel set if the tier-1 channel is assigned to the edge terminal in the terminal accessed cell; and
    deleting the tier-2 channel from the second candidate channel set if the tier-2 channel is assigned to the edge terminal in the terminal accessed cell.

7. The method of claim 1, after the step of comparing the SIRs of the tier-1 channel and the tier-2 channel and assigning the channel of a higher SIR to an edge terminal in a terminal accessed cell, further comprising:
    pre-coding transmitted data on the channel assigned to the edge terminal in the terminal accessed cell.

8. A method for suppressing inter-cell interference, comprising:
    obtaining central channels whose signal interference ratio (SIR) is above a first preset threshold from one or more central channel groups to constitute a first candidate channel set, wherein the central channels use the same soft frequency as central channels of adjacent cells;

calculating a correlation between each central channel in the first candidate channel set and a strongest interference channel of the central channel and selecting a central channel of the lowest correlation as a tier-1 channel;

obtaining edge channels whose SIR are above a second preset threshold from one or more edge channel groups to constitute a second candidate channel set, wherein the edge channels are orthogonal to edge channels of the adjacent cells;

calculating a correlation between each edge channel in the second candidate channel set and a strongest interference channel of the edge channel and selecting an edge channel of the lowest correlation as a tier-2 channel; and comparing SIRs of the tier-1 channel and the tier-2 channel and assigning a channel of a higher SIR to a central terminal in the cell which the terminal accessed.

9. An apparatus for suppressing inter-cell interference, comprising:

a first obtaining module, adapted to obtain edge channels whose signal interference ratio (SIR) are above a first preset threshold from one or more edge channel groups to constitute a first candidate channel set, wherein the edge channels are orthogonal to edge channels of adjacent cells;

a first calculating and selecting module, adapted to calculate correlation between each edge channel in the first candidate channel set and a strongest interference channel of the edge channel and select an edge channel of the lowest correlation as a tier-1 channel;

a second obtaining module, adapted to obtain central channels whose SIR are above a second preset threshold from one or more central channel groups to constitute a second candidate channel set, wherein the central channels use the same soft frequency as central channels of the adjacent cells;

a second calculating and selecting module, adapted to calculate correlation between each central channel in the second candidate channel set and a strongest interference channel of the central channel and select a central channel of the lowest correlation as a tier-2 channel; and an assigning module, adapted to compare SIRs of the tier-1 channel and the tier-2 channel and assign a channel of a higher SIR to an edge terminal in the cell which the terminal accessed.

10. The apparatus of claim 9, wherein the first obtaining module comprises:

a first calculating submodule, adapted to calculate the SIR of each edge channel in the one or more edge channel groups according to a terminal accessed cell gain and an adjacent cell gain on the edge channel and transmit power separately used by edge channels and central channels.

11. The apparatus of claim 9, wherein the second obtaining module comprises:

a second calculating submodule, adapted to calculate the SIR of each central channel according to a terminal accessed cell gain and an adjacent cell gain on the central channel and transmit power separately used by edge channels and central channels.

12. The apparatus of claim 9, wherein the first calculating and selecting module comprises:

a first calculating submodule, adapted to: combine edge channels in the first candidate channel set into an edge channel matrix set, combine the strongest interference channels of the edge channels into an interference channel matrix set, and perform singular value decomposition (SVD) separately on the edge channel matrix and the interference channel matrix; and obtain an interference item between each edge channel and its corresponding strongest interference channel as a correlation coefficient; and a first selecting submodule, adapted to select an edge channel of the smallest correlation coefficient as the tier-1 channel.

13. The apparatus of claim 9, wherein the second calculating and selecting module comprises:

a second calculating submodule, adapted to: combine central channels in the second candidate channel set into a central channel matrix set, combine the strongest interference channels of the central channels into an interference channel matrix set, and perform singular value decomposition (SVD) separately on the central channel matrix and the interference channel matrix; and obtain an interference item between each central channel and its corresponding strongest interference channel as a correlation coefficient; and a second selecting submodule, adapted to select a central channel of the smallest correlation coefficient as the tier-2 channel.

14. The apparatus of claim 9, further comprising:

a deleting module, adapted to delete the tier-1 channel from the first candidate channel set after the assigning module assigns the tier-1 channel to the edge terminal in the terminal accessed cell; or deleting the tier-2 channel from the second candidate channel set after the assigning module assigns the tier-2 channel to the edge terminal in the terminal accessed cell.

15. The apparatus of claim 9, further comprising:

a precoding module, adapted to precode transmitted data on the channel assigned by the assigning module to the edge terminal in the cell which the terminal accessed.

16. An apparatus for suppressing inter-cell interference, comprising:

a first obtaining module, adapted to obtain central channels whose signal interference ratio (SIR) is above a first preset threshold from one or more central channel groups to constitute a first candidate channel set, wherein the central channels use the same soft frequency as central channels of adjacent cells;

a first calculating and selecting module, adapted to calculate correlation between each central channel in the first candidate channel set and a strongest interference channel of the central channel and select a central channel of the lowest correlation as a tier-1 channel;

a second obtaining module, adapted to obtain edge channels whose SIR are above a second preset threshold from one or more edge channel groups to constitute a second candidate channel set, wherein the edge channels are orthogonal to edge channels of the adjacent cells;

a second calculating and selecting module, adapted to calculate correlation between each edge channel in the second candidate channel set and a strongest interference channel of the edge channel and select an edge channel of the lowest correlation as a tier-2 channel; and an assigning module, adapted to compare SIRs of the tier-1 channel and the tier-2 channel and assign a channel of a higher SIR to a central terminal in a cell which the terminal accessed.

* * * * *